(12) United States Patent
Edwards

(10) Patent No.: US 12,715,612 B2
(45) Date of Patent: Aug. 25, 2026

(54) AIRCRAFT REFUELLING/DEFUELLING SYSTEM

(71) Applicant: AIRBUS OPERATIONS LIMITED, Bristol (GB)

(72) Inventor: Henry Edwards, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/977,234

(22) Filed: Dec. 11, 2024

(65) Prior Publication Data

US 2025/0197026 A1 Jun. 19, 2025

(30) Foreign Application Priority Data

Dec. 13, 2023 (GB) ...................................... 2319056

(51) Int. Cl.
*B64F 1/28* (2006.01)
*B64D 37/32* (2006.01)

(52) U.S. Cl.
CPC ................ *B64F 1/28* (2013.01); *B64D 37/32* (2013.01)

(58) Field of Classification Search
CPC ............... B64F 1/28; B64F 37/32; F17C 5/04
See application file for complete search history.

(56) References Cited

U.S. PATENT DOCUMENTS 5,662,149 A 9/1997 Armellino
6,360,730 B1 * 3/2002 Koethe .................. B64D 37/32 123/541
7,597,288 B2 * 10/2009 Kwok .................... B64D 45/02 244/135 R
9,404,446 B2 8/2016 Fujiwara et al.
2013/0312871 A1 * 11/2013 Hoffjann ................... F17C 6/00 141/69
2021/0300586 A1 9/2021 Haberbusch et al.
2023/0243474 A1 * 8/2023 Clarke ...................... F17C 1/00 244/135 R

FOREIGN PATENT DOCUMENTS

EP 1852348 B1 7/2009
WO WO-2024015421 A1 * 1/2024 ................ B64F 1/28

OTHER PUBLICATIONS

Search Report uor Application No. GB2319056.4, dated Jun. 11, 2024, 4 pages.

(Continued)

*Primary Examiner* — Timothy L Maust
(74) *Attorney, Agent, or Firm* — Nixon & Vanderhye, PC

(57) ABSTRACT

The disclosure is directed to a fuel line terminating in a refuel connector is used to fuel (or defuel) an aircraft, for example with liquid hydrogen. A barrier is deployed around the area where the refuel connector connects to an aircraft fuel port. A gas line supplies inert gas from a supply of gas, for example nitrogen, into the area defined by the barrier. The inert gas flushes out air present around the refuel connector such that the oxygen concentration in that volume is significantly lowered. This prevents ignition of fuel in the event of a fuel leak from the refuel connector. The barrier, the gas supply, and/or the outlets for the inert gas to be supplied through are provided by a part of the aircraft.

22 Claims, 8 Drawing Sheets

(56) References Cited

OTHER PUBLICATIONS

Lei Wang et al., "Experimental study on cryogenic chilldown performance through a thick-wall tube", ScienceDirect, Cryogenics, vol. 122, Mar. 2022, 6 pages.
J. Hoelzen et al., "H2-powered aviation at airports—Design and economics of LH2 refueling systems", Elsevier, Energy Conversion and Management: X, vol. 14 (2022), 21 pages.
Tongtong Zhang et al., "Hydrogen liquefaction and storage: Recent progress and perspectives", Elsevier, Renewable and Sustainable Energy Reviews, vol. 176 (2023), 23 pages.
Muhammad Aziz, "Liquid Hydrogen: a Review on Liquefaction, Storage, Transportation, and Safety", ResearchGate, Energies, vol. 14, Sep. 18, 2021, 30 pages.
Jason Hartwig et al., "Numerical Modeling of the Transient Chilldown Process of a Cryogenic Propellant Transfer Line", NASA Glenn Research Center, American Institute of Aeronautics and Astronautics, 2015, 12 pages.
MannTek, "Quick and spill free connections for liquid hydrogen", <https://www.manntek.se/hydrogen/>, May 12, 2024, 11 pages.
Youtube video screenshots, <https://www.youtube.com/watch?v=VYfQASPLDGM>, Jul. 26, 2024, 2 pages.

* cited by examiner

AIRCRAFT REFUELLING/DEFUELLING SYSTEM

CROSS RELATED APPLICATION

This application claims priority to United Kingdom Patent Application GB 2319056.4, filed Dec. 13, 2023, the entire contents of which is hereby incorporated by reference.

BACKGROUND OF THE INVENTION

The present disclosure relates to an apparatus and method for refuelling an aircraft (and/or defuelling an aircraft). More particularly, but not exclusively, this disclosure concerns an apparatus and method for protecting against ignition of vaporised hydrogen in the event of a hydrogen leak during a refuelling process for an aircraft that is configured to use hydrogen as a fuel.

Hydrogen has been identified as a potentially environmentally preferable alternative to traditional fossil fuels, such as kerosene, in use as a fuel source for aircraft. Some aviation technologies and operations may require relatively minor adjustments to utilise hydrogen, whereas some will require significant alterations. The fuel supply and storage system is one of the latter, due to the considerably different requirements and characteristics of hydrogen in comparison to traditional jet fuels.

Traditional kerosene refuelling technology is not suitable for hydrogen refuelling for a variety of reasons. At atmospheric pressure, hydrogen must be stored at temperatures of 20K or less to be stored as a liquid. A kerosene fuel line does not have sufficient insulation to carry liquid hydrogen at this temperature, and the materials used in such a kerosene fuel line might not be able to withstand such low temperatures.

Additionally, hydrogen is a highly flammable substance, with an ignition energy (that being the energy required to cause a substance to ignite) significantly lower than kerosene. Hydrogen has a large range of concentrations in atmospheric air for which ignition can occur. Hydrogen leaks occurring during refuelling may be difficult to eliminate entirely. Current safety measures in place for preventing ignition of kerosene during a refuelling process are likely to be inadequate for preventing ignition of hydrogen.

The moment of connection of the fuel supply to the aircraft fuel port has been identified as a period of particularly high ignition risk. This is because the fuel line is not connected to the aircraft, so hydrogen vapours which may be present from a previous operation could leak out, and a potential static charge between the aircraft and refuelling equipment could be sufficient to cause ignition.

Additionally, the industry standard process for aircraft refuelling is an under-wing connection by the fuel supply. Therefore, any hydrogen vapours which leak out may not immediately disperse, but could collect in significant concentrations under the wing. Ignition of hydrogen during a refuelling process could therefore cause both injury to people handling the equipment, and damage to the aircraft and surrounding equipment.

In the case of hydrogen powered aircraft it is likely to be the case that hydrogen will need to be defuelled from the aircraft, that is retrieving hydrogen from the aircraft, for example for storage in fuel storage facilities off the aircraft if the aircraft is not operating and not likely to be needed for operation for several hours at least.

The present invention seeks to mitigate one or more of the above-mentioned problems. Alternatively or additionally, the present invention seeks to provide an improved apparatus and method of refuelling an aircraft, that can for example be used to refuel an aircraft with liquid hydrogen whilst mitigating the risk of said hydrogen igniting in the event of a leak.

SUMMARY OF THE INVENTION

According to a first aspect of the invention there is provided a method of fuelling (or defuelling) an aircraft with fuel. The method includes a step of supplying fuel, in fluid form (for example as a liquid), to an aircraft on the ground (or from the aircraft, when defuelling) via a fuel line that is connected to the aircraft at a fuel connection at the aircraft (for example a refuel port on the aircraft). The method may include a step of connecting the fuel line to the aircraft at a fuel connection of the aircraft. The fuel line may have a connector at its end for connecting to the fuel connection of the aircraft. The aircraft may have one or more fuel tanks which are connected to the fuel connection of the aircraft via pipework (i.e. one or more pipes) within the aircraft. The method may include a step of disposing a barrier around the fuel connection. Such a barrier may be provided by a part of the aircraft, for example an integrated part of the aircraft. Alternatively or additionally, the method may include a step of supplying inert gas to protect against of ignition of the fuel, for example by supplying inert gas into an area around the fuel connection, for example between a barrier and the connection, and/or within the aircraft (e.g. around fuel pipes in the aircraft, for example in the interspaces). Such a supply of inert gas may be provided by a part of the aircraft, for example an integrated part of the aircraft.

Embodiments of the invention may therefore be configured to protect against ignition in the event of a fuel leak from the refuelling system, with the use of an integrated part of the aircraft, whether that is a barrier carried by the aircraft, a supply of inert gas of the aircraft or another device or apparatus that is carried by, or forms part of, the aircraft. For example, in use, when fuel is supplied by the fuel line to (or from) an aircraft fuel tank (the fuel line being connected via the refuel connection to the aircraft on the ground), inert gas is supplied to a region shielded at least in part by a barrier, creating and maintaining an oxygen-scarce inert region around the refuel connection, thus preventing ignition of any leaked fuel. Using an integrated part of the aircraft as part of the ignition protection system may have the benefit of being able to reduce the amount or complexity of ground support equipment ("GSE") required to service the aircraft. This could reduce the GSE burden during refuel, defuel, routine maintenance, and testing operations.

The step of supplying inert gas creates an oxygen-scarce inert zone, such that for example were fuel to leak when refuelling (for example from the refuel connector), it would not be able to ignite. For example, the oxygen content immediately around the refuel connector may be less than 4% (by volume), for example less than 1%. Such a low concentration of oxygen may be important when dealing with fuels, such as liquid hydrogen, that are at higher risk of unintended ignition. Supplying inert gas can also flush leaked fuel vapours away from the aircraft, where there is a risk of static charge.

The barrier may be configured to be moveable between a deployed position and a stowed position. The method may include a step of moving the barrier to and/or from at least one of the deployed position and the stowed position. Moving the barrier from the stowed position may include expanding and/or unfolding at least part of the barrier. Moving the barrier to the stowed position may include collapsing and/or folding at least part of the barrier. It may be that the barrier in its deployed position extends outwardly from a surface of the aircraft that in flight is an exterior surface of the aircraft. This may allow for better protection against ignition risk to be provided. It may be that the barrier when in its stowed position does not extend outwardly from said exterior surface of the aircraft. This may allow for better aerodynamics when the barrier is not in use. Moving the barrier to its deployed configuration may include moving the barrier with translational movement in a direction that is transverse (e.g. substantially perpendicular) to the part of the exterior surface of the aircraft from which the barrier extends. Moving the barrier to its deployed configuration may include rotating at least part of the barrier about a hinge axis. In the deployed position, the barrier may provide a level of protection to the refuel connector and fuel connection against adverse weather conditions, for example rain.

The barrier, or a portion thereof, may in its stowed configuration prevent access to one or both of an outlet of the gas supply and the fuel connection of the aircraft, yet permit access when in its deployed configuration (optionally, when in a partially deployed configuration). The barrier, or a portion thereof, may be in the form of a door, which may for example permit access to one or both of an outlet of the gas supply and the fuel connection of the aircraft. This may allow the safety features of such a barrier to be more reliably deployed and not circumvented accidentally or otherwise.

The barrier may comprise a telescopic tube, for example a telescopic tube arranged to extend from the aircraft when deployed and to be positioned around the perimeter of the oxygen-scarce inert zone when so deployed. The barrier may comprise an inflatable portion, for example one that inflates to be deployed and deflates to be stowed. The telescopic tube may be arranged to telescope into the aircraft when stowed.

The barrier may comprise a rigid portion. Such a rigid portion may, for example, help with making the barrier sufficiently strong structurally when deployed.

The barrier may comprise a flexible portion. Such a flexible portion may, for example, help with making the barrier compact when stowed.

The movement of the barrier may be caused by an actuator, for example one that is driven by a motor, by hydraulic force or the like.

The supply of inert gas may be provided by an integrated part of the aircraft.

The inert gas supplied may comprise nitrogen, for example having a purity of greater than 90%, by volume. The inert gas supplied may comprise CO2, for example having a purity of greater than 90%, by volume. The inert gas supply on the aircraft could comprise Nitrogen, Carbon Dioxide or a noble gas. The inert gas supplied may comprise less than 4% by volume, and preferably less than 1%, of oxygen.

The inert gas may be stored in a container provided for that purpose in the aircraft, for example in an accumulator, a reservoir, a bladder, or a refillable bottle.

The inert gas may, at least in part, be generated by apparatus on the aircraft. This may relieve the need for such inert gas to be supplied by separate GSE. The apparatus may comprise an inert gas generation plant, for example a membrane air separation module and/or a pressure swing adsorption module, for example as used on an aircraft inerting system. It may be that the aircraft inerting system provides inert gas for use on other parts of the aircraft, for example, on an aircraft-based fire suppression system. It may be that the apparatus on the aircraft for generating the inert gas is configured to perform another function at a time other than when inert gas is supplied when refuelling on the ground. Using equipment that already serves another purpose on an aircraft additionally for inert gas generation, for use in an embodiment of the present invention, may have the dual benefit of not only relieving the need for the supply of inert gas by GSE but also doing this in a way that does not significantly increase the mass of equipment on the aircraft.

It may be that the inert gas is supplied from the aircraft to an outlet at a location on the exterior of the aircraft. It may be that the inert gas is supplied from the aircraft to an outlet at a location proximate to the fuel connection. There may be multiple gas outlets. There may be multiple gas outlets which are distributed circumferentially around the refuel port. For example there may be a manifold having a plurality of openings (corresponding to the above-mentioned outlets) arranged in spaced apart locations distributed circumferentially around the refuel connection. This may assist in the efficient supply of gas to the region(s) where it is required. Such a manifold may form a part of the aircraft. In embodiments, this may reduce the complexity of equipment (e.g. GSE) required externally of, separately from, the aircraft. Not only could this reduce the GSE burden, it might also give the aircraft its own ability to inert the area surrounding the refuel port. This could be beneficial in the event of a leak on the aircraft side of the fuel line—as the inert gas could be triggered in response to a leak, providing a safe environment for the ground crew (or automation) to connect to the aircraft and defuel it, prior to maintenance interventions. It may be that the (or each) inert gas outlet is separated from the outlet fuel connection by no more than 50 cm, for example less than 40 cm, optionally less than 30 cm, and possibly less than 20 cm.

The manifold may be separate from the aircraft. Such a manifold may be integrated with the fuel line for example, the openings of the manifold being in fluid communication with an inlet of the manifold that is configured to connect to a gas outlet of the supply of inert gas of the aircraft. The openings of the manifold, or of passageways for the supply of inert gas to the area around the refuel connection of the aircraft, may take the form of multiple gas nozzles.

It may be desirable to ensure that the commencing of the step of supplying inert gas and/or of the step of disposing a barrier around the connection is prior to commencing the step of supplying fuel (and optionally before a step of connecting the fuel line to the aircraft at the fuel connection of the aircraft). There may be a step of connecting the aircraft to the GSE to make a ground connection (an electrical connection to ground) so as to reduce the risk of static discharge between the aircraft and the GSE. The step of connecting the aircraft to the GSE to make a ground connection may need to be performed before fuel can be supplied. For example, a physical connection may be required in order to allow fuel to be supplied, such a physical connection causing the aircraft to be connected to the GSE to make the ground connection.

As mentioned above, the method may comprise connecting the fuel line structure to the aircraft. This may comprise pushing a refuel connector onto the fuel connection (e.g. port) of the aircraft, and optionally then locking the refuel connector onto the aircraft fuel connection. This may comprise twisting the refuel connector, or a part thereof, about its longitudinal axis. This may lock the refuel connector in place on the aircraft fuel connection. Connecting the fuel line structure to the aircraft may also comprise depressing a valve, which may establish fluid communication between the refuel connector and the fuel connection.

The step of supplying inert gas (for example, into the area between the barrier and the fuel connection, of the aircraft) may be via one or more passageways. The one or more passageways may be external to the aircraft. The method may include connecting the one or more (e.g. exterior) passageways to an outlet that is connected to a supply of inert gas (for example a gas supply apparatus of the aircraft). There may be an inert gas connection (e.g. comprising a coupling that may engage with a corresponding coupling) for connecting the outlet from the supply of gas to the passageway(s) that deliver the gas to the volume to be protected (e.g. around the fuel connection). Such an inert gas connection may comprise a circumferential seal, a push fit connector, or similar connection.

It may be desirable to allow such an inert gas connection to linearly move and/or rotate relative to the fuel connection of the aircraft to facilitate a push and/or twist interface for example. It may be that such a gas connection engages with the fuel connection of the aircraft, such as for example to facilitate such a "push and twist" interface. The fuel connection of the aircraft may for example incorporate an inert gas outlet. There may be self-alignment features such as prongs, tangs, tabs or the like to facilitate pre-alignment of the inert gas connection prior to completing the refuel connection. It may be that the inert gas connection is made before the refuel connection is made by a push/twist motion. The refuel connector may have a collar disposed radially about the end of the refuel connector. The collar may support a self-alignment feature and/or an inert gas connection. The collar may be able to rotate relative to the refuel connector.

The step of supplying fuel via the fuel line at the fuel connection may include a step of contemporaneously both connecting the fuel line to the aircraft and supplying inert gas (for example into an area defined by a barrier) to protect against ignition of the fuel. For example, the supplying of inert gas may start at the same time, or immediately before, the step of connecting the fuel line to the fuel connection of the aircraft. For example, in an embodiment, a refuel coupling at the end of a fuel line may be offered to the fuel connection of the aircraft so that a connection is made between inert gas passageways/pipework (integrated with the refuel coupling and/or fuel line) and the inert gas supply on the aircraft. In embodiments, it may be desirable from a safety perspective to ensure that the inert gas is connected before allowing the flow of fuel between the GSE and the aircraft's fuel tank pipework. It may be the case that the step of connecting the fuel line to the aircraft inevitably also causes at the same time, or immediately before, a connection to be made with the supply of inert gas.

It may be that fuel cannot be supplied until after inert gas is being supplied, for example only after a certain period of time which may be at least 2 seconds, for example at least 5 seconds. It may be that a switch, sensor or other device is activated/deactivated when inert gas is supplied, and fuel is prevented from being supplied (for example with an additional time delay) until after such activation/deactivation has happened or the supply of inert gas is otherwise deemed to have commenced.

The fuel line and the one or more passageways for the supply of inert gas may be provided as part of a fuel line structure.

The fuel may be hydrogen. The hydrogen may be supplied at a temperature below 50K. The hydrogen may be supplied at a pressure greater than 1 bar.

The method may further comprise performing a chill-down process on the fuel line, for example to lower the temperature of the fuel line and/or parts of the aircraft receiving fuel (e.g. pipework, fuel tanks and the like). This chill-down process may occur before liquid hydrogen is supplied as fuel.

The method may further comprise the step of ceasing the supply of liquid hydrogen to the aircraft, for example after the desired amount of liquid hydrogen has been supplied to the aircraft via the connected fuel line.

The method may further comprise a step of disconnecting the fuel line from the aircraft. This may involve the inverse of the step of attaching the fuel line to the aircraft. This may involve lifting a valve. This may terminate fluid communication between the refuel connector and the fuel connection. This step may involve twisting the fuel connector and/or an inert gas connector, or a part thereof, along its axis. This may unlock the connector(s) from the aircraft. The direction of twist may be opposite in direction to the step of attaching the connector. The step may further involve pulling a refuel connector of the fuel line from the aircraft fuel connection. This step may allow the refuel connector of the fuel line to be moved freely relative to the aircraft.

The method may further comprise a step of moving the barrier to its stowed position. The barrier may be folded up after removal. The barrier may be stored compactly. The barrier may take up a smaller volume when stored in comparison to when deployed.

The method may further comprise storing the fuel line and its associated structure, for example on ground support equipment. The storage of the fuel line structure may be done manually.

The method may further comprise a step of terminating the supply of inert gas. This step may be performed manually. Alternatively, this step may be performed automatically, for example after (with an optional time delay of for at least 2 seconds, for example at least 10 seconds) fuel (e.g. hydrogen) has stopped being supplied, after the fuel line has been disconnected from the aircraft or after the fuel line has been stored.

A control system may be provided which controls the flow of inert gas and/or the flow of fuel (e.g. liquid hydrogen). The control system may ensure that the flow of fuel is not started until after sufficient inert gas has been supplied and/or a certain time after the start of supplying of inert gas.

According to a further aspect of the invention, there is provided a method of fuelling an aircraft on the ground with liquid hydrogen. The method may include a step of connecting via a fuelling connector an insulated fuel line to the aircraft. The method may include a step of performing a chill-down process on the fuel line. The method may include a step of supplying liquid hydrogen to the aircraft via the fuel line and the fuelling connector. The method may include a step of using an integrated part of the aircraft (for example, a deployable barrier and/or a supply of inert gas) to reduce the risk of ignition of the hydrogen by using a barrier and/or by reducing the relative concentration of oxygen in a region to be protected (e.g. in the vicinity of the fuelling connector and/or in the vicinity of pipes leading from the fuelling connector into the aircraft). It may be that the steps are commenced in an order different from the order the steps are set out above.

According to a yet further aspect of the invention, there is provided an aircraft structure comprising a refuel port and an ignition protection system for a ground based refuelling system for an aircraft. The aircraft structure may form part of an aircraft, for example including an exterior surface of the aircraft. The refuelling system comprises a fuel line terminating at a refuel connector connectable to the refuel port. The ignition protection system may comprise a structure configurable between a deployed configuration in which it provides a barrier around the refuel connector and a stowed configuration. Alternatively, or additionally, the ignition protection system may comprise a supply of inert gas for supplying inert gas into a volume around the refuel port.

It will be appreciated that similar apparatus to the above-mentioned refuel port, ignition protection system, ground based refuelling system, and refuel connector could be used when performing a defuelling process—i.e., when fuel flows from the aircraft via the fuel line, for example to GSE/a fuel reservoir off the aircraft, as opposed to when fuel is supplied to the aircraft. As such the terms, "refuel port", "refuelling system", and "refuel connector" are to be understood as encompassing the defuelling use case—i.e. as if the word "refuel" (and/or "refuelling") is replaced with the word "defuel" (and/or "defuelling), insofar as that makes senses in the context (with any other changes to other words as may be required).

As mentioned above, the fuel line terminates at one end at a refuel connector. The other end of the fuel line may be connected, or otherwise be in fluid communication with, a supply of fuel. The supply of fuel may be accommodated in ground support equipment.

The barrier, when in its deployed position, may have a maximum dimension that is less than 100 cm. The barrier, when in its deployed position, may surround the refuel port radially on all sides, that is the barrier extends around all 360 degrees about the refuel port. It may be that the barrier on one side of the refuel port provides more of a barrier to passage of gases (e.g. by being bigger) than on an opposite side of the refuel port.

The structure configurable to provide the barrier may have a maximum dimension that is less than 120 cm, for example no more than 60 cm, such that for example it may easily be carried within the aircraft when stowed. The barrier may, in use, have a diameter (or width) which is no more than 100 cm for example. The barrier, in use, may be no more than 1 m in length (defined along the axis parallel to the axis of the fuel line). The barrier is preferably so shaped and sized to be large enough to allow a human operator to access the refuel connector manually, with the barrier in situ, but small enough that the volume of inert gas within the barrier is at a manageable level (for example much less than a cubic metre, preferably less than 0.3 m3).

It may be that the barrier when deployed has a first end and a second opposite end, the second end being configured to be directly adjacent to, or housed within, the aircraft structure when the barrier is deployed. When deployed the first end of the barrier may be open. In such a case the volume into which inert gas is supplied in use may thus be open to atmosphere. This may then require the inert gas to be supplied at a rate high enough to constantly flush the volume with inert gas and discourage the presence of atmospheric air in the volume as a result of the through-flow of inert gas. When deployed, the first end of the barrier may be closed. In such a case, the first end may have a sealed opening to permit passage of the refuel connector and/or a portion of the gas line. In such a case, in use, the volume defined by the barrier may be enclosed on all sides, with little or substantially no possibility of leakage of gas into the volume from the atmosphere. In use, the volume may be supplied with an over-pressure of inert gas (the barrier being engineered to allow non-negligible, but nevertheless relatively low, flow of gas from the volume to atmosphere) so that atmospheric oxygen is restricted/prevented from entering the volume during refuelling. One or both of the ends may be shaped so that the end substantially coincides with a plane.

It may be that the structure is configurable to provide a barrier around both the refuel connector and a section of the fuel line, for example a section being at least 10 cm long.

The barrier may have rotational symmetry about an axis that may be parallel (e.g. in line with) the fuel line axis in use. The barrier may be in the shape of a cylinder. The barrier may be in the shape of a dome. The base of the dome may be in contact with the aircraft via a seal. The barrier may be in contact with the aircraft via a seal. The seal may be made of a flexible material. This may assist the seal in conforming to the shape of the aircraft, for example a curved or discontinuous surface, for example where a section of the seal passes over a panel gap of the aircraft.

At least one wall of the barrier may be made of a flexible material. This may reduce the weight of the barrier and/or allow the barrier to be moved between an "in-use" configuration and a stowed configuration and/or aid removal of the barrier.

At least one wall of the barrier may be made of rigid material. Such a wall may be substantially planar.

It may be that the barrier has a wall of flexible material adjacent to a wall of rigid material. In that way, the barrier may be partially collapsible as a result of the flexible material folding or flexing yet also have a sufficient strong wall of rigid material to assist with a structural function, such as for example supporting the flexible material when the barrier is deployed and/or forming at least part of an external surface of the aircraft when in the stowed configuration.

It may be that the ignition protection system of the aircraft structure comprises the structure configurable to provide a barrier but not the supply of inert gas (that optionally being supplied by GSE). It may be that the ignition protection system comprises the supply of inert gas, but not the structure configurable to provide the barrier (that optionally being supplied by GSE). It may be that the ignition protection system of the aircraft structure comprises both the structure configurable to provide a barrier and the supply of inert gas. The ignition protection system may be configurable to supply inert gas into a volume between the barrier in its deployed configuration and the refuel connector when connected to the refuel port.

The supply of inert gas may be connected to a gas outlet adjacent to the refuel port. The aircraft structure may have a formation (for example, a prong, tang, tab, stop or the like) which is adjacent to the gas outlet and the refuel port, such that a refuel connector of a refuelling system with a corresponding formation can be located correctly with the formation of the aircraft structure and the corresponding formation of the refuel connector engaged, with the gas inlet and the gas outlet aligned and with the fuel inlet and the fuel outlet aligned.

The refuel connector may have a rotating mechanism (for example a twist and push mechanism) for forming a connection with an adequate seal. The refuel connector may have a rotating mechanism in the form of a twist, push and lock mechanism, for example.

There may be provided an aircraft including the aircraft structure of any aspect of the invention as described or claimed herein. The aircraft may be used in combination with a ground-based refuelling system according to any aspect of the invention as described or claimed herein. Such a refuelling system may comprise the fuel line and the refuel connector (e.g. at the end of the fuel line for connecting to an aircraft fuel port), as described or claimed herein. The fuel line may be configured for supplying cryogenic hydrogen. The fuel line may be tubular. The fuel line may be flexible, for example via one or more joints, to increase ease of use. The fuel line may be insulated using vacuum-insulation. Such vacuum-insulation may for example take the form where a near-vacuum is created between the surface of the item being insulated, and a second surface disposed a distance from the first surface. This significantly reduces heat transfer by convection and conduction. The fuel line may be a part of a fuel line structure, that may for example include other parts or apparatus associated with the fuel line (e.g. an insulating layer). For example, the combination of the fuel line, refuel connector, and vacuum-insulation, may be considered as a fuel line structure.

As noted above, the refuel connector is configured to connect to an aircraft fuel port. The aircraft fuel port may be on the airframe of the aircraft. The aircraft fuel port may be on the underside of the aircraft wing. The aircraft fuel port may be on the fuselage of the aircraft. The aircraft fuel port may be on the engine nacelles. In use, inert gas may be supplied into the volume between the barrier and the refuel connector.

The refuel connector may be integrated with a manifold, which when the refuel connector is connected to the refuel port, extends circumferentially around the refuel port. The manifold may have a plurality of openings arranged in spaced apart locations, for example distributed circumferentially around the refuel connector. The openings are in fluid communication with an inlet of the manifold that is configured to connect to the gas outlet(s) of the aircraft structure.

The present invention also provides a ground-based refuelling system, the ground-based refuelling system being for use with an aircraft including an aircraft structure as claimed or described herein or being for use as part of a method of fuelling an aircraft according to any aspect of the invention as described or claimed herein. The ground-based refuelling system comprises a fuel line terminating in a refuel connector. The fuel line may be configured to supply liquid hydrogen at a temperature below 50K.

The present invention also provides an aircraft including an aircraft structure as claimed or described herein.

The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft. The aircraft need not be configured for carrying passengers, but could for example be an aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

A similar invention to that described and claimed herein is described and claimed in UK patent application entitled "REFUELLING/DEFUELLING AN AIRCRAFT" with agent's reference "P038381 GB", having the same filing date as the present application. The contents of that application are fully incorporated herein by reference. The claims of the present application may incorporate any of the features disclosed in that patent application and vice versa.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

Figure 1:
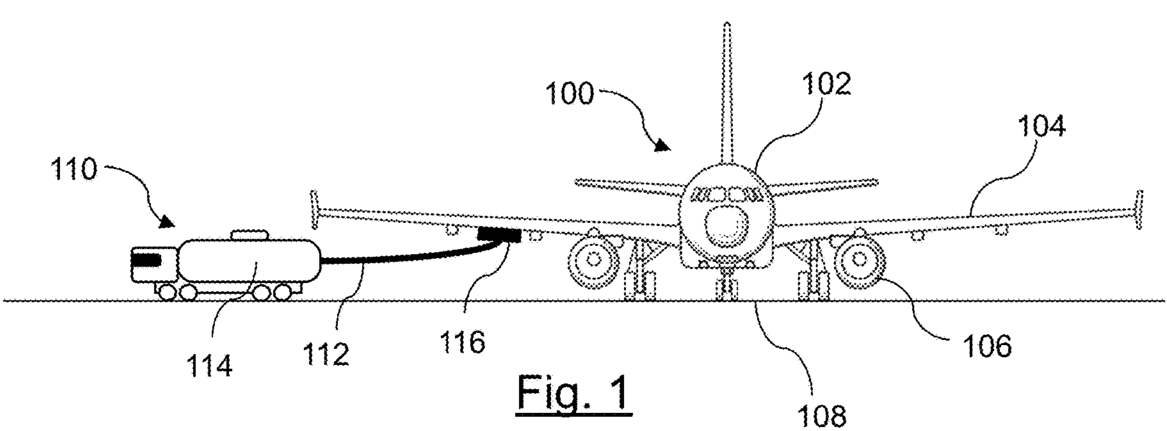
FIG. 1 shows a front view of an aircraft being refuelled by ground support equipment according to a first embodiment of the invention.
Figure 5A:
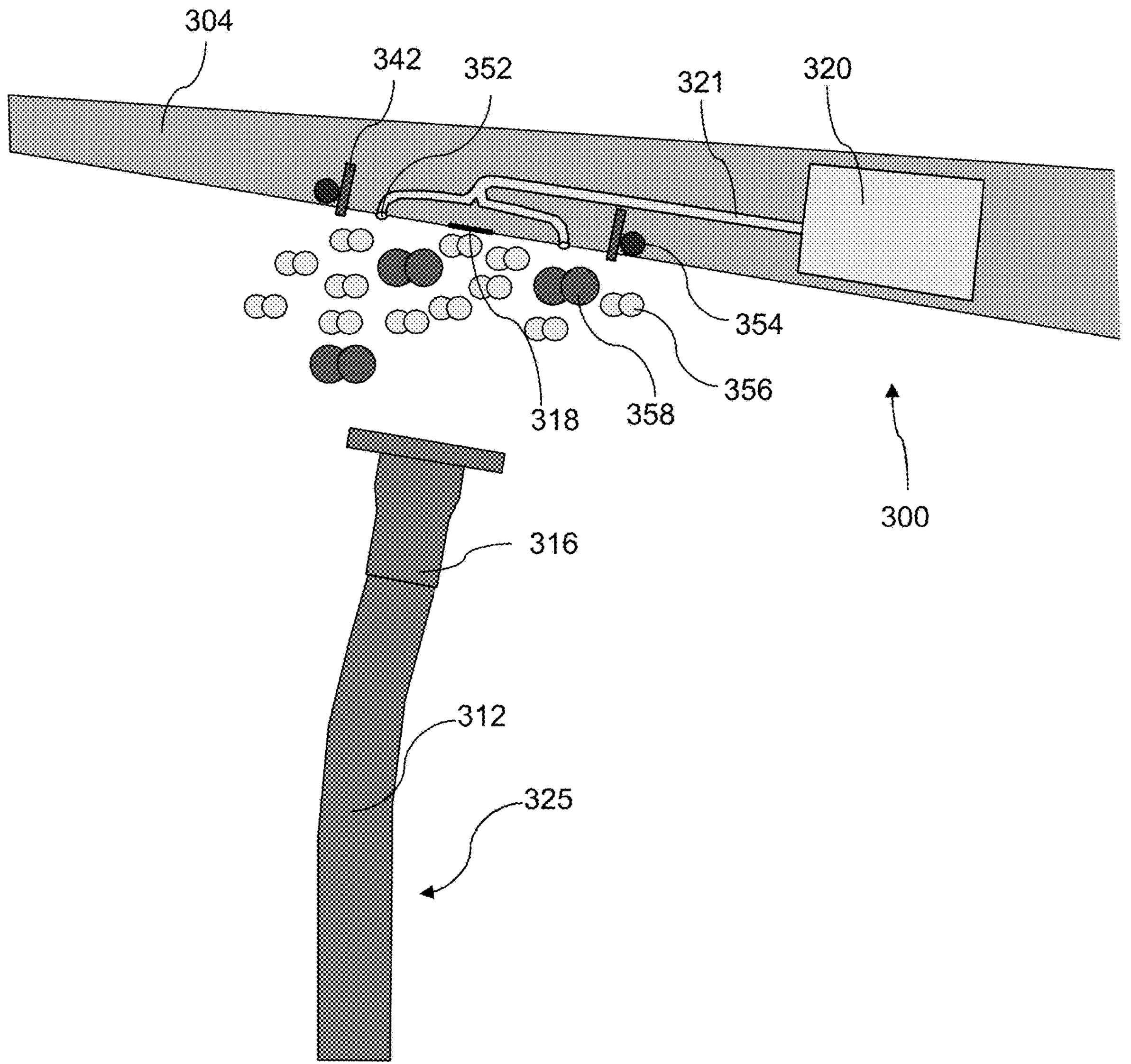
Figure 6A:
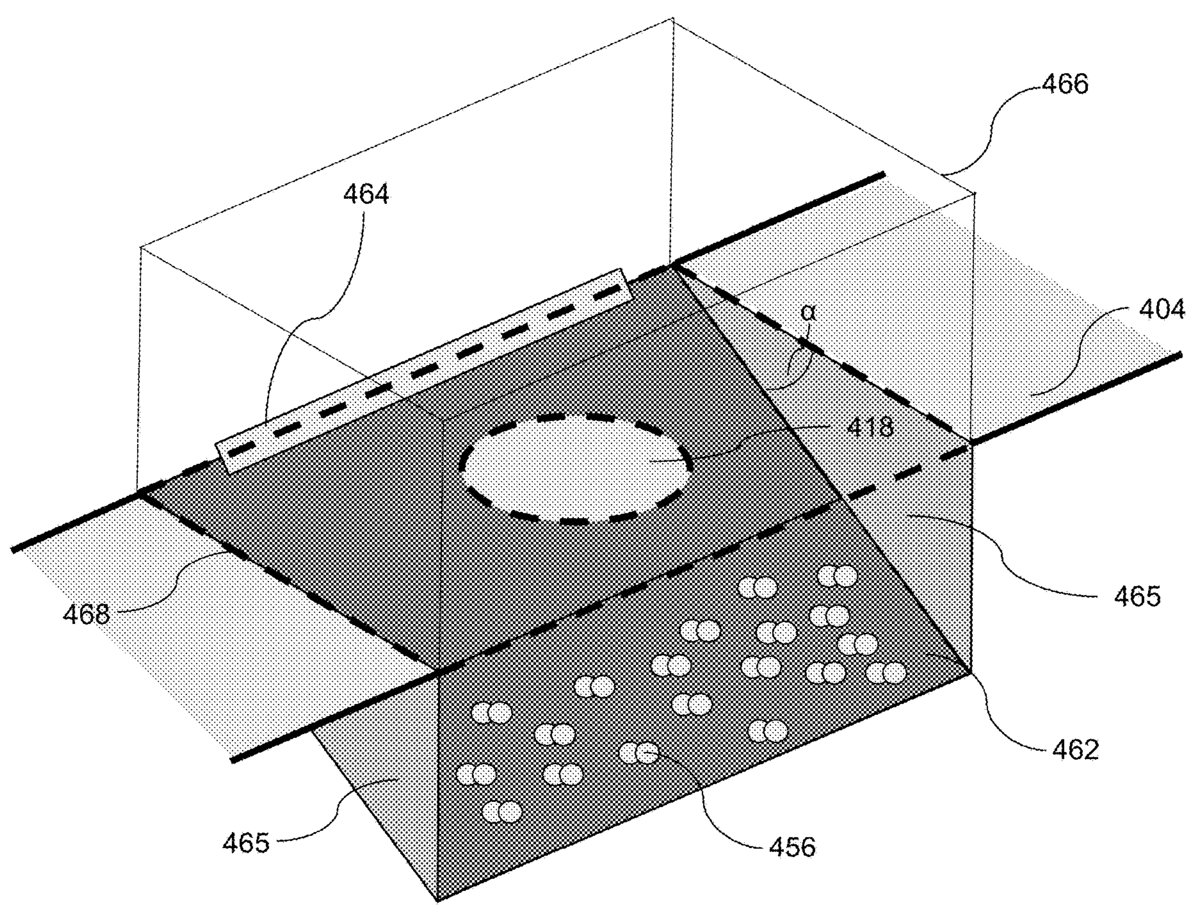
Figure 7:
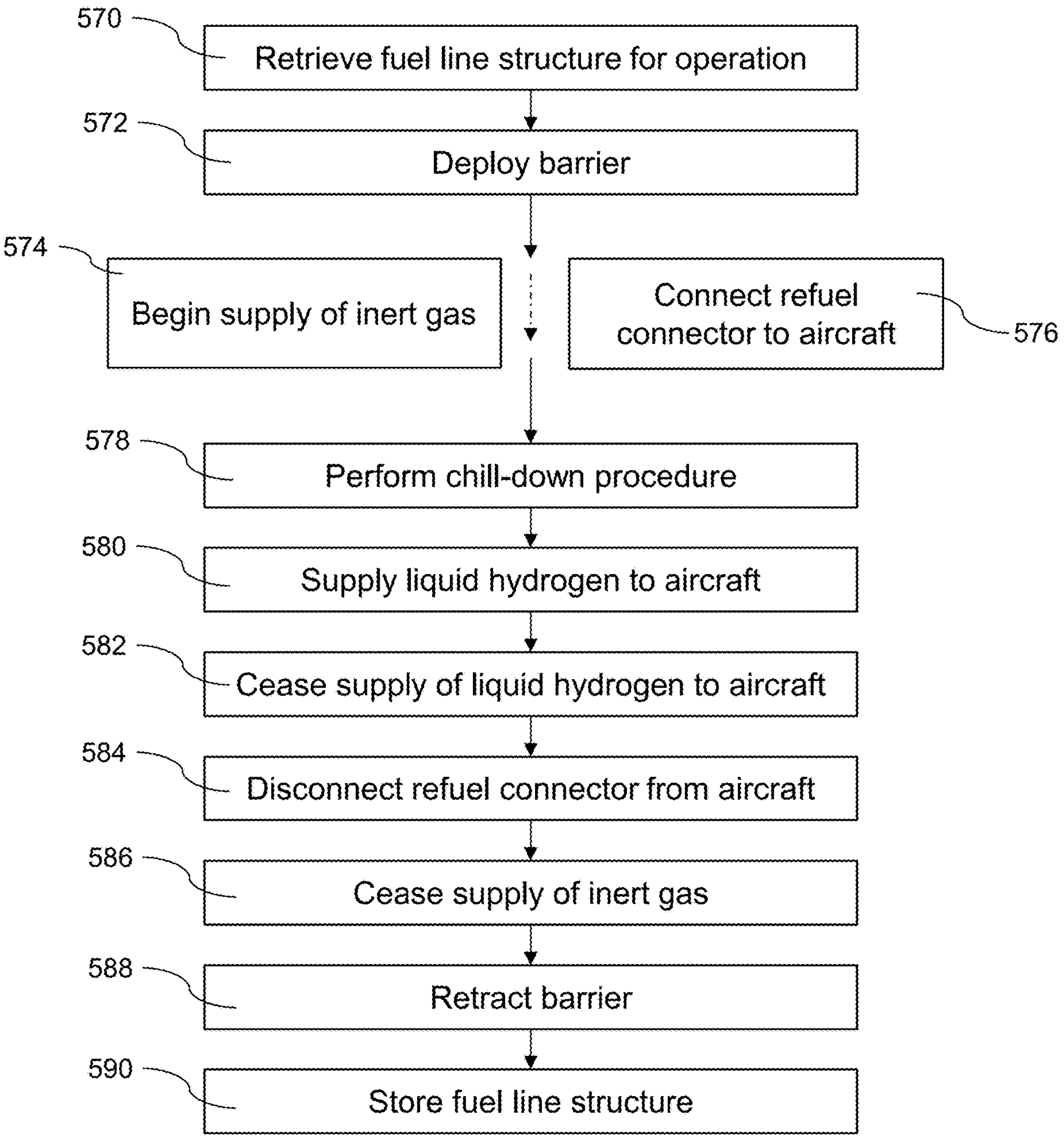

FIG. **5*a* shows a refuel ignition protection apparatus fully integrated onto the aircraft of FIG. 1**, comprising a deployable and retractable barrier and wing-integrated gas line outlets, according to a third embodiment of the invention;

FIG. **5*b* shows the refuel ignition protection apparatus of FIG. 5*a*** in use, wherein the fuel line structure has been connected, the barrier is in the deployed position, and inert gas is being supplied;

FIG. **6*a*** shows a refuel ignition protection apparatus comprising a pivoting cover disposed over the fuel port, the opening of which deploys a barrier and releases a supply of inert gas according to a fourth embodiment of the invention;

FIG. **6*b* shows the refuel ignition protection apparatus of FIG. 6*a* where the cover is in the fully open position, the barrier is fully deployed, and inert gas has filled the volume around the fuel port; and FIG. 7** shows a flow diagram illustrating a method of refuelling an aircraft with liquid hydrogen whilst reducing ignition risk using the present invention, according to a fifth embodiment of the invention.

DETAILED DESCRIPTION

Embodiments of the present invention relate to an ignition protection system for a ground-based refuelling system for an aircraft, in particular when refuelling an aircraft with liquid hydrogen. In use of the embodiments, inert gas is supplied to a region defined by a barrier formed locally around the refuel connector. The supply of inert gas to this region reduces the risk of ignition of hydrogen gas when refuelling.

FIG. 1 shows a hydrogen-powered aircraft 100 comprising a fuselage 102, wings 104, and engines 106, located on the ground 108, being refuelled by ground support equipment 110 via a fuel line 112. The ground support equipment carries a source 114 of liquid hydrogen fuel (stored cryogenically) and connects to the aircraft via a refuel connector 116. This refuel connector 116 is configured to connect and lock to an aircraft fuel port 118 (not shown separately in FIG. 1), located on the underside of the aircraft wing 104. The fuel is supplied to a tank system in the aircraft, the tanks of which may be housed in the wings 104 and/or in the fuselage 102 for example. A supply of inert gas (not visible) is also present within the aircraft 100, and may be housed in the wings 104 and/or in the fuselage 102 for example.

Figure 2:
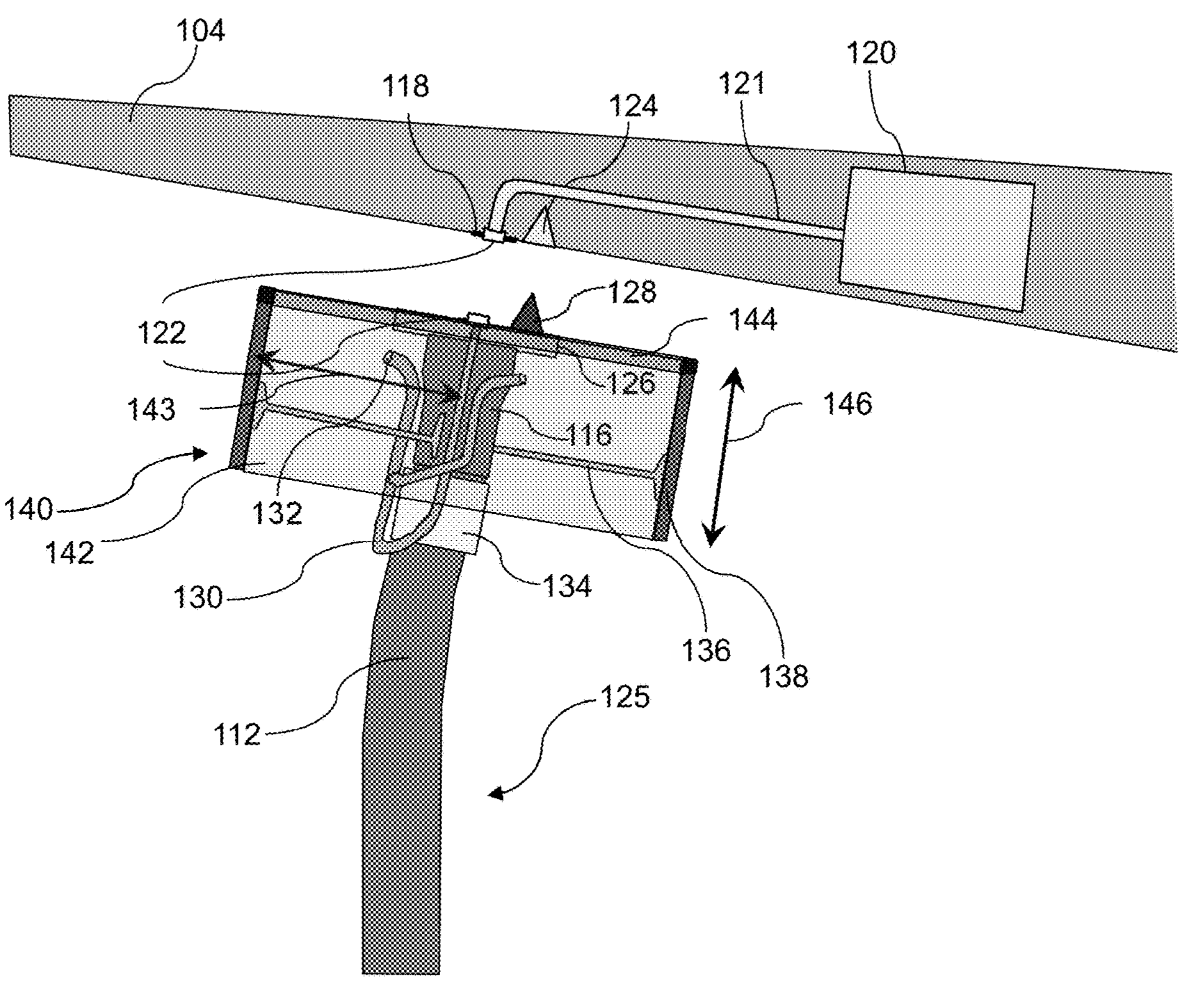
FIG. 2 shows a refuel ignition protection apparatus immediately before connection to the aircraft of the first embodiment.

FIG. 2 shows a schematic view of the refuel system immediately prior to connection to the aircraft fuel port 118 (partially shown in FIG. 2) underneath the aircraft wing 104 according to an embodiment of the present invention. Housed within the wing 104 is a supply 120 of inert gas, connected to an aircraft gas line 121 which terminates in a gas line connector 122. The gas line connector 122 is adjacent to the fuel port 118. Additionally within the wing 104 is located a female refuel connector aligner 124. FIG. 2 shows in greater detail the refuel system comprising the fuel line 112 arranged to supply liquid hydrogen and the refuel connector 116 at an end of the fuel line 112. The fuel line 112 is a rigid tube with flexible joints (in other embodiments the flexibility of the fuel line may be providing by means of flexible tubing). The fuel line is insulated with vacuum insulation (not visible). The combination of the fuel line, vacuum insulation, and refuel connector 116, may be considered as being part of a fuel line structure 125, which may additionally include ancillary components.

The refuel connector 116 further comprises a support collar 126 disposed around the top of the refuel connector 116. This support collar 126 supports a corresponding gas line connector 122 such that in use the two gas line connectors 122 connect together to create a route for inert gas to flow. The support collar can move about its axis relative to the refuel connector. This is described in more detail below. In this embodiment the two gas line connectors are identical, but this may not be the case in other embodiments. For example, the two ends may have a male/female connection arrangement. Otherwise, the two connectors may be differentiated by their being upstream or downstream relative to the supply of inert gas. The support collar 126 also comprises a male refuel connector aligner 128.

Connected to the gas line connector 122 present on the support collar 126, is a gas line 130. The gas line 130 runs generally parallel to the refuel connector along their axes. In the present embodiment, the gas line is a flexible tube. This gas line supplies inert gas, in this case nitrogen having a purity of more than 99% by volume. Proximate to the refuel connector, the gas line 130 bifurcates into two gas lines. Each bifurcated gas line terminates in a respective gas line outlet 132. In another embodiment, the gas line may furcate into more than two gas lines, and/or furcate more than once, each line terminating in a respective gas line outlet 132, for example.

The gas line 130 and gas line outlets 132 are held in place by a structural support collar 134 located on the fuel line structure 125 below the support collar 126, that is closer to the ground support equipment. This collar 134 is free to rotate about the axis of the fuel line structure where it is situated. In this embodiment, the gas lines not situated on the aircraft are therefore part of the fuel line structure.

Two spokes 136 extend from the refuel connector 116. The spokes 136 are connected to the refuel connector 116 by a suitable fixing (not shown) such as a hub which is clamped onto the refuel connector 116. The spokes 136 are rigid. Each spoke extends radially out from the fuel line 112 (that is, in a direction that is substantially perpendicular to the direction of the axis of the local portion of the fuel line). Each spoke is connected to a barrier support member 138. The barrier support members 138 are rigid. Each barrier support member 138 is disposed generally parallel with the axis of the refuel connector 116, and generally perpendicular to the spoke to which it is attached. The barrier support members and the spokes may collectively be considered as defining a barrier support structure 140.

The barrier support structure 140 supports a cylindrical barrier 142 (that resembles the form of a veil), represented as being partially transparent in FIG. 2 for clarity. In the present embodiment, the barrier material is flexible and the barrier 142 is open at both ends. In order to support the flexible barrier 142, the barrier support structure 140 may further comprise additional circular rings (not shown) arranged along the longitudinal axis of the barrier to act as a skeletal support structure. The cylindrical barrier is detachably connected to the support structure by suitable fixings (not shown). The radius of the cross section of the cylindrical barrier (being half its diameter, when in use), indicated by double-headed arrow 143, is about 35 cm. In the present embodiment, the circular cross section of the cylindrical barrier and the circular cross section of the fuel line 112 are substantially concentric. The barrier support structure and the barrier are fixed in place relative to the fuel line.

An annular seal 144, represented as being partially transparent in FIG. 2 for clarity, is connected to the top of the barrier support structure 140 (i.e. at the far end of the cylindrical barrier 142), so that the bottom face of the seal 144 and the upper face of the barrier are flush.

The barrier 142 (including seal 144) is about 30 cm in length in the present embodiment (its length being along its axis and perpendicular to the diameter), indicated by double-headed arrow 146. In use, when the seal is engaged with the surface of the aircraft wing 104 around the fuel port 118 the barrier encloses the refuel connector 116 radially on all sides (i.e. extends 360 degrees around the connector, when viewed in the axial direction). The gas line outlets 132 are located within the interior volume defined by the barrier.

Figure 3:
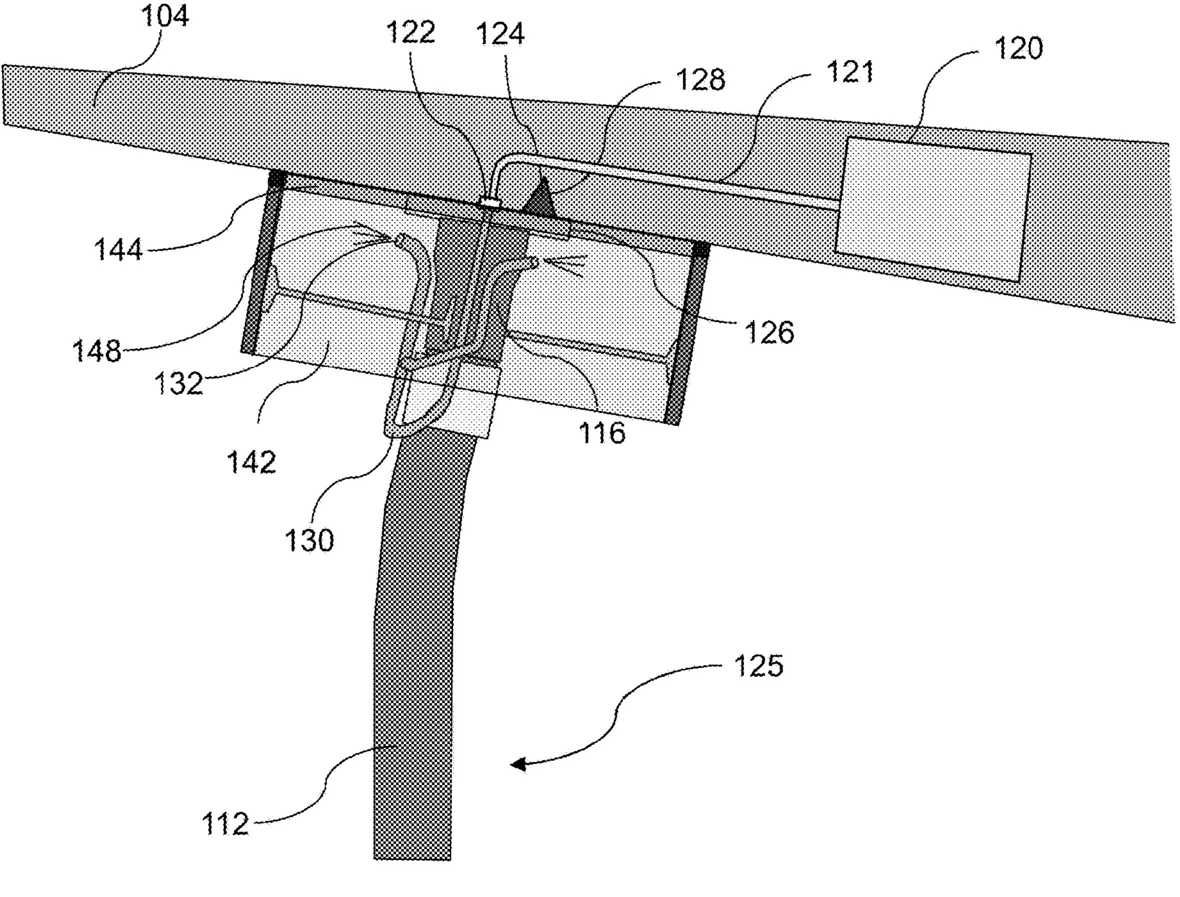
FIG. 3 shows the refuel ignition protection apparatus of the first embodiment after connection to the aircraft of the first embodiment.

FIG. 3 shows the embodiment of the invention in FIG. 2 in use. The barrier 142 and seal 144 are again portrayed as partially transparent for clarity. The refuel connector 116 is connected to the aircraft fuel port 118 (obscured due to connection with the refuel connector 116 and support collar 126). This allows for fuel, in this embodiment liquid hydrogen, to be supplied through the fuel line 112 into the aircraft fuel tanks (not pictured) via fuel pipes (not pictured). The hydrogen is supplied at a temperature of around 20K, and at pressures of between 1 and 10 bar.

The cylindrical barrier 142 of this embodiment is open at the end nearest to the ground support equipment (not pictured) and is also open at its far end, which in use is pressed against the aircraft wing 104, via the annular seal 144. When so positioned, the annular seal 144 is flush with the surface of the aircraft wing such that the volume defined by the annular seal 144 and cylindrical barrier 142 is bounded at its top by the aircraft wing surface, the refuel connector 116, and the support collar 126. In this way, the seal seals the space between the barrier and the aircraft wing surface. This prevents and/or reduces egress of gas out the top of the cylinder volume defined by the cylindrical barrier and annular seal, and moreover ingress of atmospheric air into the volume from the region directly adjacent to the aircraft wing surface and outside the cylindrical barrier.

In this arrangement, the two gas line connectors 122 are connected (such that they appear as one item in FIG. 3). Correct alignment of the downstream gas line connector with the aircraft wing 104 is ensured by the female and male refuel connector aligners 124 and 128 respectively. The male refuel connector aligner is aligned within the female refuel connector aligner in this arrangement.

In use of this embodiment, the combination of the cylindrical barrier 142 on the fuel line and the supply of inert gas 120 in the aircraft which supplies inert gas to the space within the barrier, together is used to protect against ignition (i.e. significantly reduce the risk of ignition compared to the case of not employing such a system) in the event of a hydrogen fuel leak from the fuel line structure 125 during a refuelling operation.

In use, Nitrogen located in the inert gas supply 120 within the aircraft wing 104 is supplied through the aircraft gas line 121, through the gas line connectors 122, through the gas line 130, and exits through the inert gas line outlets 132. In the present embodiment, the nitrogen is supplied at ambient temperature. The nitrogen is also supplied at atmospheric pressure. The nitrogen, represented by lines 148, exits the inert gas line outlets into the volume enclosed by the cylindrical barrier 142, annular seal 144, surface of the aircraft wing 104, refuel connector 116, and support collar 126.

The constant supply of nitrogen into the enclosed volume defined by the cylindrical barrier 142, annular seal 144, surface of the aircraft wing 104, refuel connector 116, and support collar 126, causes gas previously present in said volume to be flushed out and to be replaced with nitrogen. This will mean that the refuel connector, which poses the highest risk of leaking hydrogen, is constantly surrounded by an abnormally high concentration of inert gas in comparison to regular air. Therefore, the concentration of oxygen molecules in the volume will be significantly lower than that of regular air. Chiefly, the oxygen concentration is lower than 1%. Therefore, should a hydrogen leak occur in this situation, the concentrated hydrogen vapour will not be able to ignite due to the low oxygen concentration. Through the same process, any leaked hydrogen vapour will be sufficiently dispersed by the inert gas supply such that upon leaving the volume it will not be sufficiently concentrated to ignite.

Figure 4:
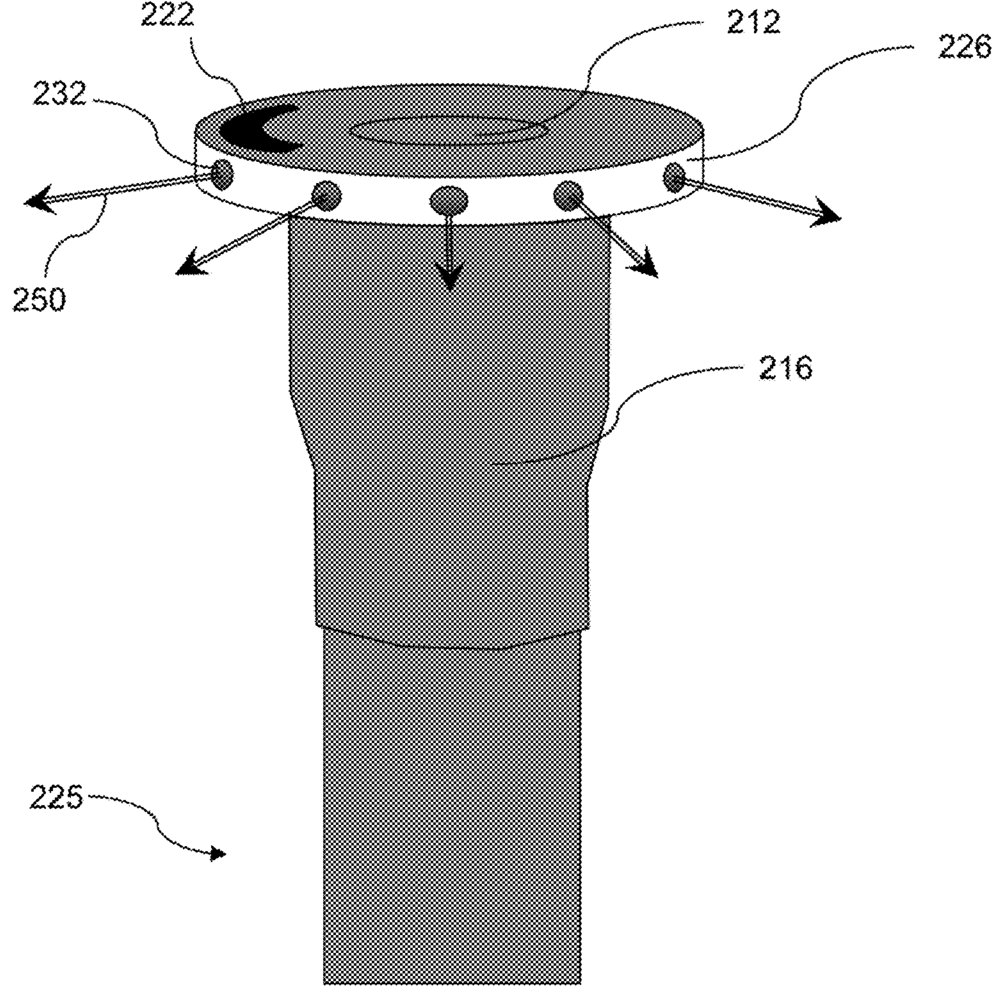
FIG. 4 shows a partially integrated refuel connector, gas line connector, and plurality of gas line outlets according to a second embodiment of the invention.

FIG. 4 shows an arrangement according to a second embodiment of the present invention as an alternative to that of FIGS. 2 and 3. FIG. 4 shows a gas line connector 222 and gas line outlets 232 as parts of a fuel line structure 225. The section of gas line being supported by the structural support collar, and also the structural support collar itself, is no longer present. The other elements of the embodiment as displayed in FIG. 2 are still present, but some are omitted from FIG. 4 for clarity. FIG. 4 shows a fuel line structure 225 terminating in a refuel connector 216. Housed within the fuel line structure 225 is a fuel line 212. Vacuum insulation (not shown) is present within the fuel line structure 220, to thermally insulate the fuel line 212. A gas line connector 222 is present on the uppermost surface of the refuel connector. This gas line connector is connected to a gas line which is within the refuel connector 216. Within the fuel line structure, the gas line furcates into a plurality of gas lines, each associated with a gas line outlet 232. Each gas line outlet 232 is arranged circumferentially around the surface of the support collar 226. In use, the fuel line 212 connects to the fuel port of the aircraft and the gas line connector 222 connects to a gas port of the aircraft that is supplied with inert gas from the gas supply on the aircraft. Therefore, even dispersal of the inert gas is achieved. Inert gas exiting the gas line outlets is represented by arrows 250.

FIG. 5*a* shows an alternative arrangement of the apparatus according to a third embodiment of the present invention. The fuel line structure 325 including a fuel line 312, vacuum insulation (not shown), and a refuel connector 316 are present, as well as the aircraft fuel port 318, the barrier 342, the inert gas supply 320, and the aircraft gas line 321. In this embodiment, the aircraft gas line 320 bifurcates within the wing 304 of the aircraft 300, each bifurcated aircraft gas line terminating in an aircraft gas line outlet 352. These outlets are located on the exterior of the wing, and proximate to the fuel port.

Figure 5B:
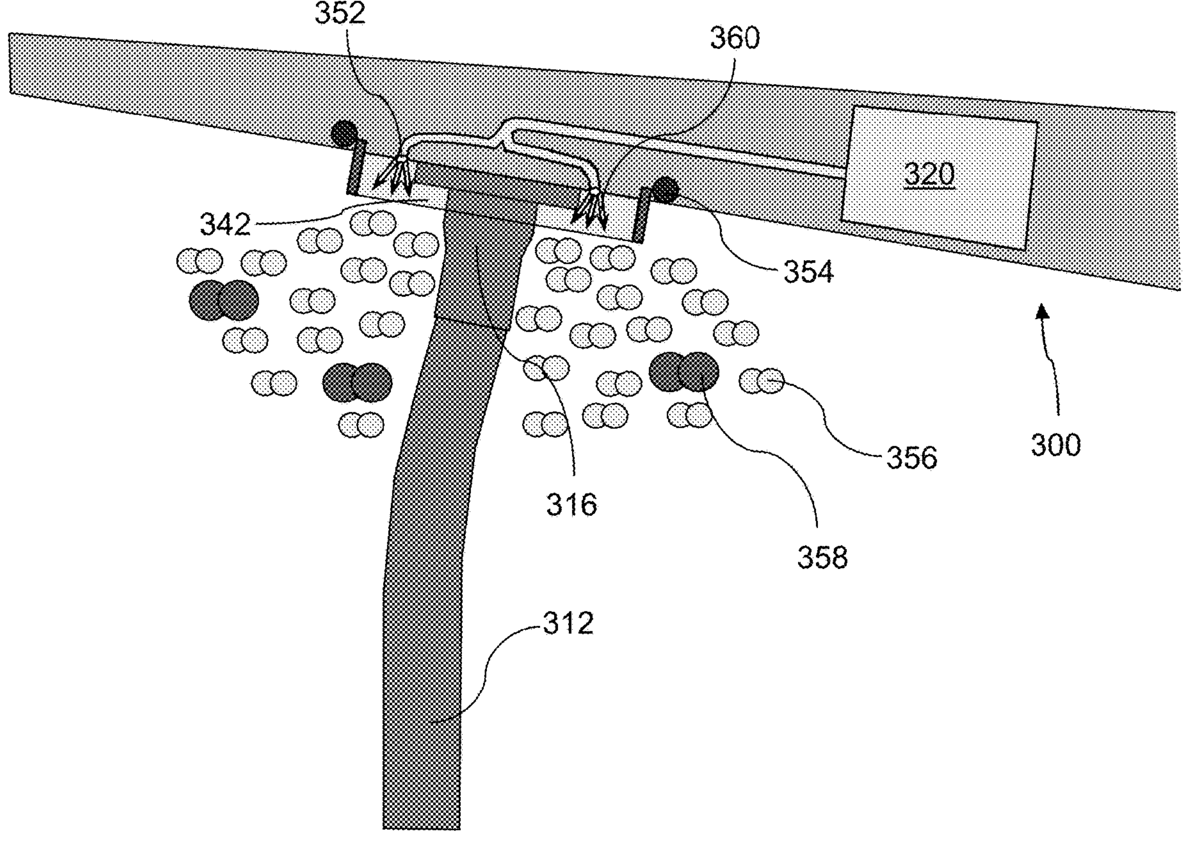

In this embodiment, the aircraft houses the barrier 342 when not in use. Thus, it will be seen that FIG. 5*a* shows the cylindrical barrier 342 disposed within the aircraft wing 304. The barrier 342 is orientated such its longitudinal axis is parallel with the axis of the refuel connector 316 when connected to the aircraft. Further, the circular cross section of the cylindrical barrier is concentric with the circular cross section of the refuel connector at the point of connection to the aircraft. The cylindrical shape of the barrier 342 is open at each end of the cylinder. The radial distance of the barrier walls from the axis of the refuel connector when connected to the aircraft is larger than the radial distance of the aircraft gas line outlets 352 from the same point. Therefore, the barrier encircles the aircraft gas line outlets, aircraft fuel port 318, and refuel connector. Adjacent to, and outside the defined volume of the barrier, are two actuators 354. These actuators 354 are configured to move the barrier along the barrier's axis between a deployed position (as shown in FIG. 5*b*) and a stowed position (as shown in FIG. 5*a*). In the deployed position, the barrier is extended outwardly from the aircraft wing surface. In the stowed position, the barrier does not extend outward from the aircraft wing surface.

Also present in FIG. 5*a* are schematic representations of gases. Nitrogen molecules are represented by the lighter-shaded smaller-sized pairs of circles 356, and oxygen molecules are represented by the darker-shaded larger-sized pairs of circles 358. As can be seen, before connection of the fuel line structure 325 to the aircraft, and before use of the barrier 342 or inert gas apparatus, there are molecules of both oxygen 358 and nitrogen 356 present in the area immediately surrounding the aircraft fuel port 318.

FIG. 5*b* shows the embodiment of FIG. 5*a* in use. The fuel line 312 is connected via the refuel connector 316 is connected to the aircraft fuel port (not visible). The action of the actuators 354 has caused the barrier 342 (represented as partially transparent for clarity) to be moved along its axis so as to surround the aircraft gas line outlets 352 and the location where the refuel connector 316 connects to the aircraft. Nitrogen is being pumped out of the inert gas line outlets, indicated by the arrows 360. As can be seen, gas present in the vicinity of the refuel connector is flushed out of the barrier and is replaced with gaseous nitrogen 356 from the inert gas supply. This causes any oxygen 358 present to be removed from the vicinity of the refuel connector, such that the oxygen concentration within the barrier is less than 1%. Therefore, should a hydrogen leak occur, there will not be sufficient oxygen present for ignition. Additionally, the hydrogen will be dispersed by the nitrogen such that, after exiting the barrier, it is not concentrated enough to ignite. Further, the flushing effect moves any leaked hydrogen away from the aircraft surface, which provides the highest ignition risk due to static charge.

FIG. 6*a* shows a fourth embodiment of the present invention. This embodiment comprises the aircraft wing 404 (only the wing bottom surface shown for clarity, viewed from above) and the outline of the aircraft fuel port 418 in the wing underside. The fuel port leads, via pipework, to the aircraft fuel tanks (not shown for clarity). The aircraft wing comprises a cover 462 (in the form of a door) on the underside, which covers the aircraft fuel port from the outside. At one edge of this cover is a hinge 464. The cover pivots about the hinge axis. Within the aircraft wing is located a nitrogen compartment, the outline of which is shown by lines 466. This compartment is continuously filled with nitrogen gas 456 from the aircraft inert gas supply (not pictured), at least immediately before and during any refuelling process that occurs. FIG. 6*a* shows the cover 462 (dark grey) in its partially open state, an angle α to the horizontal. The action of opening the cover deploys a flexible barrier 465, shown highly schematically in both FIGS. 6*a* and 6*b*, in the form of two side portions each attached at one end to a side edge of the cover 462. The straight dashed lines 468 illustrate the location of the cover in the stowed state (i.e. substantially horizontal). In the stowed state, the cover forms part of the aircraft surface, and prevents egress of nitrogen gas from the nitrogen compartment above. A fixing (not pictured) fastens the cover to the aircraft in the stowed state. It will be appreciated that when the cover is opened, nitrogen gas then exits the opening (previously closed by the cover) and floods the region immediately beneath the port 418 with nitrogen gas.

Figure 6B:
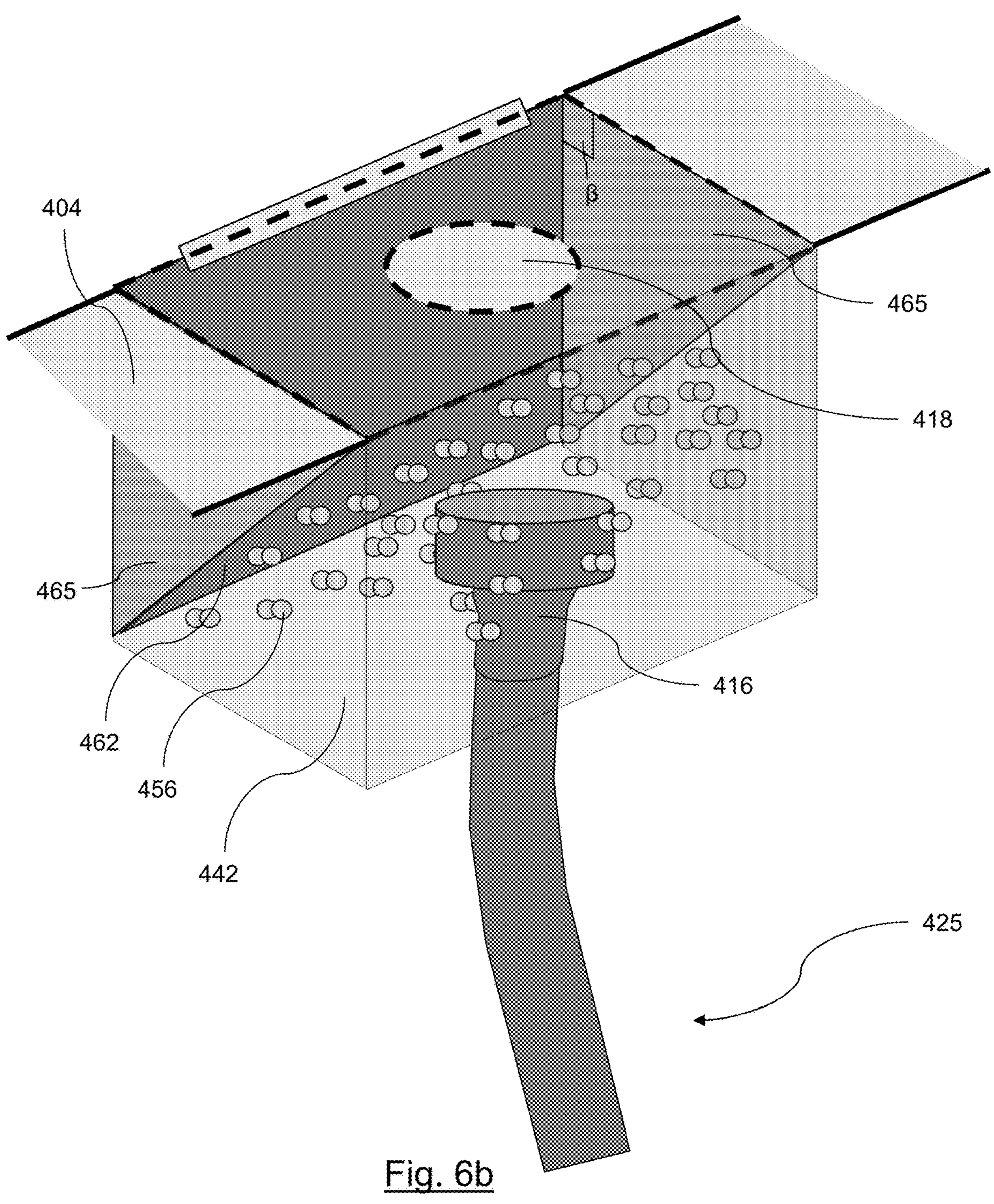

FIG. 6*b* shows the apparatus of FIG. 6*a* in the fully deployed position (the nitrogen compartment not pictured). The cover 462 is fully down at an angle R of 90 degrees to the horizontal, with the cover 462 and the two side portions 465 together acting as a barrier that extends below the port 418. In this embodiments, a flexible veil also descends to form a barrier 442 (presented as partially transparent for clarity) around the fuel port 418. (In other embodiments, it may be that the cover 462—and optionally the side portions 465—form a barrier that does not extend the full 360 degrees around the region immediately below the port 418—and may have an open side opposite the side formed by the cover 462 when in the position shown in FIG. 6*b*, as well as being open to the atmosphere underneath.)

When the cover is deployed (e.g. see FIG. 6*b*) Nitrogen 456 present within the chamber within the wing 404 (bottom surface shown only) exits and enters the volume defined by the barrier, displacing atmospheric oxygen from the region. The refuel connector 416 of the fuel line structure 425 is therefore surrounded by nitrogen predominantly when being brought to the aircraft for attachment. Therefore, accessing the fuel port 418 automatically flushes the area with nitrogen and deploys a barrier, creating an inert gas shield around the refuel connector 416 and aircraft fuel port 418. Nitrogen continues to flow from the aircraft, such that if fuel (e.g. in vapour or gaseous form) were to leak in the area, it too would be flushed away by the nitrogen gas. The cover has outlets (not shown) near the handle (not shown) and other areas most likely to be touched by a person.

FIG. 7 shows a flow diagram illustrating a method according to a fifth embodiment of the present invention, which for example utilises the apparatus of any of the first to fourth embodiments. The method is performed in respect of ground support equipment fuelling of an aircraft on the ground. The method is performed for the purpose of refuelling an aircraft with liquid hydrogen whilst protecting against hydrogen ignition in the event of a hydrogen leak. The method includes a step of retrieving 570 a fuel line structure for operation. More specifically, this involves manually retrieving a refuel connector from ground support equipment. The method further comprises the step of deploying a barrier 572. This barrier is disposed around the refuel connector. This barrier is connected to, and integral with, the aircraft. It may be deployed by opening a hatch on the aircraft (e.g. the hatch forming the barrier or a part thereof), or by being moved into a deployed position by actuators so that it extends out of the aircraft. In an alternative version of this embodiment, the barrier is provided permanently, or semi-permanently provided, on the refuel connector.

A further step is conducted in which inert gas is supplied 574. The inert gas is supplied to the region immediately around the refuel connector.

The method further comprises a step of connecting the aforementioned fuel line structure to the aircraft 576 via the refuel connector. This refuel connector connects to a connection point, e.g. fuel port, on the aircraft. The connector is connected by pushing the refuel connector onto the corresponding connection point, and then rotating the refuel connector (or a part thereof) about its axis to lock it in place. A valve (not shown) is then depressed to establish fluid communication between the refuel connector and fuel port, such that fluids can pass from one to the other. It may be that performing this step causes, or can only be performed after, a step of connecting the inert gas supply and/or the step of supplying the inert gas. Having inert gas being supplied before the making of the connection with the refuel connector has the benefit of reducing ignition risk if a leak occurs when making that connection.

In other embodiments, the connection of the refuel connector to the aircraft may be performed differently without affecting the benefits of embodiments of the invention. The step 576 of connecting the refuel connector may for example cause connection of gas line connectors which connect a supply of gas in the aircraft with gas flow passageways on equipment external of the aircraft that are then used to supply gas to the desired location. Thus, this step (connecting gas connectors) may be done contemporaneously with the step 576 of connecting the fuel line via the refuel connector, for example immediately before the step 576 is completed. The step 574 of supplying inert gas could then be performed. This would still cause inert gas to be supplied through gas line outlets before the aircraft and fuel line structure are used to supply the liquid hydrogen fuel, and thus improve safety. Supplying inert gas before supplying liquid hydrogen may be aided by a collar. The collar supporting the gas line connector and aligner can rotate independently of the refuel connector. The collar may allow for alignment and connection of the gas line connectors before the refuel connector is rotated to lock it in place. This may ensure that the inert gas supply can begin before fuel can be supplied.

A further step of the method comprises performing a chill-down procedure 578 on the fuel line, before supplying the liquid hydrogen. This involves reducing the temperature of the fuel line, fuel tank, and any intermediate/ancillary components such that cryogenic fluid, in this case liquid hydrogen, can be passed through for use as fuel. This is performed in order to maintain a generally vapour-free liquid flow of liquid hydrogen, thus reducing the risks of spikes in pressure (due to the low boiling point of hydrogen relative to ambient temperatures). The method further comprises supplying liquid hydrogen fuel to the aircraft 580 through the fuel line. This step is performed until the aircraft tanks have the desired quantity of fuel for the specific situation. The method further comprises a step of ceasing the supply of liquid hydrogen to the aircraft 582. The method further comprises a step of disconnecting the fuel line structure via the refuel connector from the aircraft 584. This step comprises the inverse of attaching the fuel line structure to the aircraft. The valve (not shown) is lifted, terminating the fluid connection between the refuel connector and the fuel port. Then, the refuel connector is rotated about its longitudinal axis, in the opposite direction to the direction used for attaching, to unlock the refuel connector. Then, the refuel connector is pulled away from the connection point. Depending on the apparatus, this step may also involve detaching the gas line connectors on the support collar and aircraft wing. In this embodiment, this is done after the twist and pull procedure to disconnect the refuel connector. This ensures that inert gas continues to be supplied out the gas line outlets until after the supply of liquid hydrogen has ceased, and is supplied during any potential leaks which may occur in the disconnection process.

The method further comprises the step of terminating the supply of inert gas 586 from the inert gas supply. In the case where removal of the refuel connector also results in removal of the gas line outlets, then this step may be done contemporaneously with the detachment of the gas line connectors. The method further comprises a step of retracting the barrier 588. This barrier may be connected to the aircraft or the fuel line structure. It may be removed by closing a hatch, or by being moved into the stowed position by actuators for example. The method further comprises a step of storing the fuel line structure 590 in the ground support equipment.

The illustrated embodiments described above thus enable a significant reduction in the risk of ignition of hydrogen when refuelling an aircraft with cryogenic hydrogen as a result of creating, with the use of an appropriately positioned veil or other barrier, a region that can be supplied with sufficient inert gas to create a volume of low flammability adjacent to the aircraft and in the vicinity of the refuelling equipment and of the manual operators handling such equipment. The equipment for reducing the ignition risk is at least partly carried by, and/or forms a part of, the aircraft, thus relieving the need for GSE to carry such things. Furthermore, the aircraft may be designed to ensure that refuelling with hydrogen, or other fuel, can not be performed without the safety precautions (e.g. barrier in place and/or inert gas supplied) being in operation.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The apparatus and method of the embodiment may be used to defuel an aircraft such that the flow of fuel is from the aircraft not to the aircraft. Very little modification would be required to the embodiments in order to achieve that.

The apparatus may be used to reduce the concentration of oxygen/reduce ignition risks in regions other than in the vicinity of a fuel port. For example, there may be benefits in supplying (e.g. "flooding) other regions with an inert gas such as N2 to prevent fire/ignition risk, such as a region around pipework/fuel lines in the aircraft (i.e. the "inter-spaces"), particularly if the pipework/lines are used to carry fuel from the fuel port to the fuel tanks on the aircraft, with such pipework/lines not being used at any other time.

The fuel supplied to the aircraft may not be liquid hydrogen. This apparatus and method may be suitable for preventing ignition of other flammable sources or fuels.

The illustrated embodiments have been described with reference to underwing refuelling. However, it may be that other refuelling locations exist on a hydrogen-fuelled aircraft, such as via the fuselage. Embodiments of the invention would be suitable for refuelling at these locations.

The barrier may have a shape different than described with reference to the illustrated embodiments.

The inert gas could comprise CO2 and/or argon (or other gases from group 18 of the periodic table), and possibly less or no Nitrogen. What is important is that the inert gas has a very low concentration of oxygen.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. A method of fuelling/defuelling an aircraft with fuel, comprising:

supplying fuel, in fluid form, to/from an aircraft on the ground from a refuelling source on the ground via a fuel line that is connected to the aircraft at a fuel connection at the aircraft, disposing a barrier around the connection, supplying inert gas by a part of the aircraft into an area between the barrier and the connection to protect against ignition of the fuel, and wherein at least one of the barrier and the supply of inert gas is provided by a part of the aircraft.

2. The method of claim 1, wherein the barrier is provided by a part of the aircraft and is moveable between a deployed position and a stowed position.

3. The method of claim 2, wherein the barrier when in its deployed position extends outwardly from a surface of the aircraft that in flight is an exterior surface of the aircraft, and wherein the barrier when in its stowed position does not extend outwardly from said exterior surface of the aircraft.

4. The method of claim 1, wherein the inert gas is generated by apparatus on the aircraft, the aircraft being configured to perform another function at a time other than when inert gas is supplied.

5. The method of claim 1, wherein the inert gas is supplied from the aircraft to an outlet at a location on the exterior of the aircraft and proximate to the fuel connection.

6. The method of claim 1, wherein the step of supplying inert gas is via one or more passageways, and the method includes connecting the one or more passageways to an outlet that is connected to the supply of inert gas of the aircraft.

7. The method of claim 6, wherein the step of supplying fuel via the fuel line at the fuel connection includes a step of contemporaneously both connecting the fuel line to the aircraft and connecting the one or more passageways for the supply of inert gas to the outlet.

8. The method of claim 7, wherein the fuel line and the one or more passageways for the supply of inert gas are provided as part of a fuel line structure.

9. The method of claim 1, wherein fuel is liquid hydrogen.

10. The method of claim 1, wherein the method further comprises performing a chill-down process on the fuel line.

11. A method of fuelling/defuelling an aircraft on the ground with liquid hydrogen, the method including the steps of:

connecting via a fuelling connector an insulated fuel line to the aircraft, performing a chill-down process on the fuel line, supplying liquid hydrogen to/from the aircraft via the fuel line and the fuelling connector, and using an integrated part of the aircraft to supply inert gas and to reduce the risk of ignition of the hydrogen by reducing the relative concentration of oxygen in the vicinity of the fuelling connector.

12. The method of claim 11, wherein the integrated part of the aircraft is a deployable barrier and/or a supply of inert gas.

13. An aircraft structure comprising a refuel port and comprising an ignition protection system for a ground-based refuelling system for an aircraft being refuelled, the refuelling system comprising a fuel line terminating at a refuel connector connectable to the refuel port, wherein the ignition protection system comprises:

a structure configurable between a deployed configuration in which it provides a barrier around the refuel connector and a stowed configuration, and/or a supply of inert gas by a part of the aircraft for supplying inert gas into a volume around the refuel port or within the aircraft.

14. The aircraft structure of claim 13, wherein the ignition protection system comprises the structure configurable to provide a barrier and wherein the barrier, when in its deployed position, has a maximum dimension that is less than 100 cm and surrounds the refuel port radially on all sides.

15. The aircraft structure of claim 13, wherein the ignition protection system comprises both the structure configurable to provide a barrier and the supply of inert gas, wherein the ignition protection system is configurable to supply inert gas into a volume between the barrier in its deployed configuration and the refuel connector when connected to the refuel port.

16. The aircraft structure of claim 13, wherein the ignition protection system comprises the supply of inert gas and wherein the supply of inert gas is connected to a gas outlet adjacent to the refuel port.

17. The aircraft structure of claim 16, wherein the aircraft structure has a formation which is adjacent to the gas outlet and the refuel port, such that the refuel connector of the refuelling system with a corresponding formation can be located correctly with the formation of the aircraft structure and the corresponding formation of the refuel connector engaged, with the gas inlet and the gas outlet aligned and with the fuel inlet and the fuel outlet aligned.

18. An aircraft including the aircraft structure of claim 13 and configured to be used with the ground-based refuelling system for the aircraft, wherein the refuelling system comprises the fuel line and the refuel connector.

19. The aircraft of claim 18, wherein the fuel line is configured for supplying cryogenic hydrogen including being vacuum-insulated.

20. A ground-based refuelling system for an aircraft, the system comprising a fuel line terminating in a refuel connector, the fuel line being configured to supply liquid hydrogen at a temperature below 50K and the ground-based refuelling system being configured for use as the ground-based refuelling system of claim 18.

21. An aircraft including the aircraft structure of claim 13.

22. An aircraft including an aircraft structure comprising a refuel port and comprising an ignition protection system for a ground-based refuelling system for an aircraft, the refuelling system comprising a fuel line terminating at a refuel connector connectable to the refuel port, wherein the ignition protection system comprises:

a structure configurable between a deployed configuration in which it provides a barrier around the refuel connector and a stowed configuration, and/or a supply of inert gas for supplying inert gas into a volume around the refuel port or within the aircraft, wherein the refuel connector is integrated with a manifold, which when the refuel connector is connected to the refuel port, extends circumferentially around the refuel port.

* * * * *